(12) United States Patent
Dorize et al.

(10) Patent No.: US 9,001,658 B2
(45) Date of Patent: Apr. 7, 2015

(54) METHOD FOR REDUCING ENERGY CONSUMPTION IN PACKET PROCESSING LINECARDS

(75) Inventors: Christian Dorize, Nozay (FR); Georg Post, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 65 days.

(21) Appl. No.: 13/580,451

(22) PCT Filed: Mar. 25, 2011

(86) PCT No.: PCT/EP2011/054591
§ 371 (c)(1),
(2), (4) Date: Oct. 11, 2012

(87) PCT Pub. No.: WO2011/120879
PCT Pub. Date: Oct. 6, 2011

(65) Prior Publication Data
US 2013/0039204 A1 Feb. 14, 2013

(30) Foreign Application Priority Data
Mar. 31, 2010 (EP) .................................... 10290171

(51) Int. Cl.
*G06F 1/32* (2006.01)
*H04L 12/801* (2013.01)

(52) U.S. Cl.
CPC .............. *H04L 47/10* (2013.01); *G06F 1/3209* (2013.01); *G06F 1/324* (2013.01); *G06F 1/3287* (2013.01); *G06F 1/329* (2013.01); *Y02B 60/1217* (2013.01); *Y02B 60/1278* (2013.01); *Y02B 60/1282* (2013.01); *Y02B 60/144* (2013.01)

(58) Field of Classification Search
CPC ...................................................... H04L 49/405
USPC .................................................. 370/235, 252
See application file for complete search history.

(56) References Cited

U.S. PATENT DOCUMENTS 7,149,795 B2 * 12/2006 Sridhar et al. ................. 709/223
7,219,249 B1 * 5/2007 Ghose et al. .................. 713/324
7,844,839 B2 * 11/2010 Palmer et al. ................. 713/300

(Continued)

FOREIGN PATENT DOCUMENTS

EP          2101245          9/2009

OTHER PUBLICATIONS

S. Waldbusser; Remote Network Monitoring Management Information Base draft-ietf-rmonmib-rmonfull-01.txt; Remote Network Monitoring MIB Remote Network Monitoring Management Information Base; Dec. 24, 1999; IETF Standard-Working-Draft; Internet Engineering Task Force, IETF, CH, vol. rmonmib, No. 1, Dec. 24, 1999; XP015026464; ISSN: 0000-0004; p. 21-p. 29.

*Primary Examiner* — Jay P Patel
(74) *Attorney, Agent, or Firm* — Carmen Patti Law Group, LLC

(57) ABSTRACT

The present invention refers to a method for reducing energy consumption in a packet processing linecard of a packet transmission network, said packet processing linecard comprising a plurality of microprocessors aimed at processing packet traffic wherein the number of active microprocessors is dynamically adjusted as a function of the computation of a traffic estimator based on a recurrent estimation of at least two statistical parameters including the average and a parameter representative of the statistical distribution of the packet traffic.

4 Claims, 8 Drawing Sheets

(56) References Cited

U.S. PATENT DOCUMENTS

| | | | |
|---|---|---|---|
| 8,051,324 B1* | 11/2011 | Zhao et al. | 714/11 |
| 2005/0079875 A1* | 4/2005 | Carlson | 455/456.1 |
| 2006/0174142 A1* | 8/2006 | Lin et al. | 713/300 |
| 2006/0291473 A1* | 12/2006 | Chase et al. | 370/395.5 |
| 2008/0047363 A1* | 2/2008 | Arms et al. | 73/862 |
| 2009/0252054 A1* | 10/2009 | Barkan et al. | 370/252 |
| 2009/0304022 A1 | 12/2009 | Yang et al. | |
| 2010/0061245 A1 | 3/2010 | Larsen | |
| 2011/0010337 A1* | 1/2011 | Bu et al. | 707/609 |

* cited by examiner

METHOD FOR REDUCING ENERGY CONSUMPTION IN PACKET PROCESSING LINECARDS

BACKGROUND OF THE INVENTION

The present invention relates to the field of packet based network and more precisely to packet processing linecards.

Packet processing linecards are used to process the aggregated data transmitted, at different layers of networking, from the Internet Protocol (IP) layer down to the physical layer in the network nodes.

Such process represents a major energy consumption in a packet transportation network and with a rising traffic tends to raise the operational and cooling costs and may also reduce the reliability of the routers.

Besides, the bursty aspect of data transportation corresponding to large fluctuations over different time scales makes the dimensioning of said packet processing linecards difficult and leads to a waste of energy during off-peak traffic.

Thus, it becomes essential to develop a solution allowing to reduce the energy consumption of the packet processing linecards.

SUMMARY OF THE INVENTION

One object of the present invention is to overcome the precited drawbacks of the state of the art and offer an alternative to the existing solutions of the state of the art to provide a reduction of the energy consumption in the packet processing linecards of the network nodes.

This is achieved by a method for reducing energy consumption in a packet processing linecard of a packet transmission network, said packet processing linecard comprising a plurality of microprocessors aimed at processing packet traffic wherein the number of active microprocessors is dynamically adjusted as a function of the computation of a traffic estimator based on a recurrent estimation of at least two statistical parameters including the average and a parameter representative of the statistical distribution of the packet traffic.

According to another aspect of the present invention, the parameter representative of the statistical distribution of the packet traffic comprises a statistical moment of the packet traffic.

According to a further aspect of the present invention, the statistical moment of the packet traffic comprises the standard deviation of the packet traffic.

According to an additional aspect of the present invention, the parameter representative of the statistical distribution of the packet traffic comprises a quantile of the packet traffic.

According to another aspect of the present invention, the recurrent estimation is achieved using multiple temporal ranges for the computation of the traffic estimator.

According to an additional aspect of the present invention, an inactive microprocessor is set in a low consumption mode.

According to a further aspect of the present invention, the driving voltage of the active microprocessors is dynamically adjusted in function of the computation of the traffic estimator.

According to another aspect of the present invention, the clock rate of the active microprocessors is dynamically adjusted in function of the computation of the traffic estimator.

According to an additional aspect of the present invention, the determination of the number of active microprocessors takes into account the maximum load of the microprocessors in order to respect a predetermined Quality of Service.

According to another aspect of the present invention, a delay is introduced before deactivating a microprocessor in order to reduce very short periods of inactivity of a microprocessor.

According to a further aspect of the present invention, packet traffic comprises packet flows and said packet flows are sorted in function of their quality of service (QoS) value and, in case of congestion, the most valuable flows are processed in priority by the microprocessors.

According to an additional aspect of the present invention, microprocessors are configured to process specific classes of packets such that the decision of activating or deactivating a microprocessor takes into account the packet class-specific configuration of said microprocessor.

According to another aspect of the present invention, the packet processing linecard is configured such that packets belonging to a common end-to-end flow are treated in the chronological order of the reception.

According to a further aspect of the present invention, the packet processing linecard is configured such that data synchronization is guaranteed by a regulation of the access of common resources.

The present invention also refers to a packet processing linecard wherein it comprises:
- a plurality of microprocessors configured to process packet traffic,
- means for monitoring packet traffic,
- a traffic estimator configured to compute a traffic load in function of a recurrent estimation of at least two statistical parameters including the average and a parameter representative of the statistical distribution of the packet traffic,
- decision means configured to determine the required number of active microprocessors in function of a traffic load estimation computed by the traffic estimator,
- activation means configured for activating or deactivating microprocessors in function of the decision means determination.

According to another aspect of the invention, the number of microprocessors of the packet processing linecard corresponds to the result of a computation using a priori traffic estimation based on at least two statistical parameters including the average and a parameter representative of the statistical distribution of the packet traffic and considering the maximum traffic to be processed by the packet processing linecard (1) and such that the overall energy efficiency remains maximum.

DETAILED DESCRIPTION OF THE INVENTION

The embodiments of the present invention refer to the use, in packet processing linecards, of a plurality or array of microprocessors having a reduced processing clock rate such that the packet processing load is distributed among the plurality of microprocessors.

Such solution allows to reduce the energy consumption by adapting the number of active microprocessors in function of the traffic and by limiting the power dissipation of the microprocessors (due to their limited processing clock rates) and thus reducing the cooling expenses.

However, to obtain a significant reduction of energy consumption, the determination of the necessary number of microprocessors coupled with the determination, at any time, of the configuration of the array of microprocessors in function of the traffic is essential.

Thus, the embodiments of the present invention refer to the use of a traffic estimator allowing to determine dynamically the number of microprocessors of the array needed to be activated.

Figure 1:
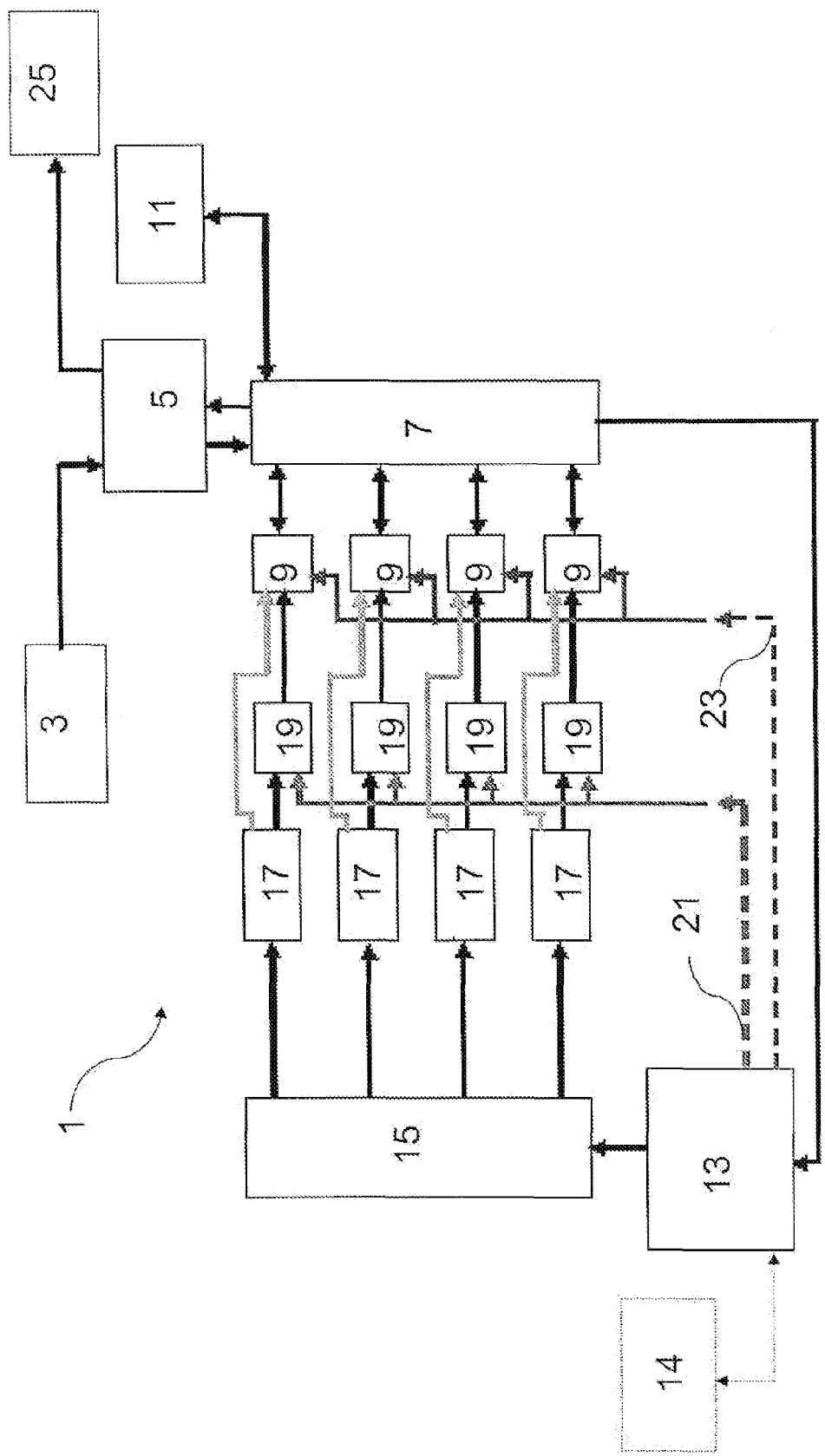
FIG. 1 is a diagram of a packet processing linecard according to the present invention.

FIG. 1 represents an example of configuration of a packet processing linecard 1 wherein the input packets 3 are received in a packet First In First Out (FIFO) equipment 5 and are transmitted to a data exchange unit (pipeline or bus or switch) 7 where they undergo a plurality of processes achieved by the plurality of microprocessors 9. Said processes read and optionally update the dedicated look-up tables 11 comprising information about the packet flows forwarded through the linecard.

Moreover, statistical data concerning the traffic of packet processed in the pipeline 7 are sent as input to a traffic estimator 13. Based on the computation of the predicted traffic by said estimator 13, a microprocessor scheduler 15 controls the microprocessors 9 through task logic tools 17 and switches 19.

Furthermore, according to an embodiment of the present invention, the traffic estimator 13 directly controls the clock rate of the switches 19 and the driving voltage of the microprocessors 9 (represented by the dotted arrows 21 and 23). When all the processes are done, packets are forwarded as output packets 25 outside of the data exchange unit 7 through the packet FIFO equipment 5 to their destination.

It has to be noted that the array of microprocessors 9 represented in FIG. 1 comprises four microprocessors 9 but depending on the dimensioning of the packet processing linecard 1, any number of microprocessors 9 may be gathered in the array. Moreover, the energy consumption of the adaptation units (estimator 13, scheduler 15, switches 19 . . . ) is negligible with respect to the microprocessor 9 energy consumption such that the dimensioning (determination of the optimal number of microprocessors to produce a minimized power consumption in an a priori worst case of traffic conditions) of the linecard 1 may be based only on the microprocessors 9 consumption.

The first step for using an array of microprocessors 9 is to dimension the packet processing linecard 1, that is to say, to determine the number of microprocessors 9 and the capacity of said microprocessors 9 to reach an optimal energy consumption. In the embodiments on the present invention, such dimensioning corresponds to a step of the linecard design and is achieved a priori and statically using traffic estimation and based on models of power consumption described in the literature:

The power consumption of a microprocessor 9 can be defined by $$power = k \cdot v \cdot V^2$$

with k a constant of the microprocessor 9, $v$ the clock rate or clock frequency and V the driving voltage of the microprocessor 9.

Furthermore, $v$ and V are linked by the following model relation:

$$V = h_\gamma(v) = a \cdot v^\gamma + b \text{ with } v_{min} \leq v \leq v_{max} \text{ and } V_{min} \leq V \leq V_{max}$$

where $\gamma$ is a parameter dependent of the microprocessor technology, $V_{min}$ and $V_{max}$ the respective minimal and maximal driving voltage functioning values for the microprocessor 9, and $v_{min}$ and $v_{max}$ the maximal clock rate functioning values corresponding to the respective voltages $V_{min}$ and $V_{max}$ for the microprocessor 9.

Figure 2:
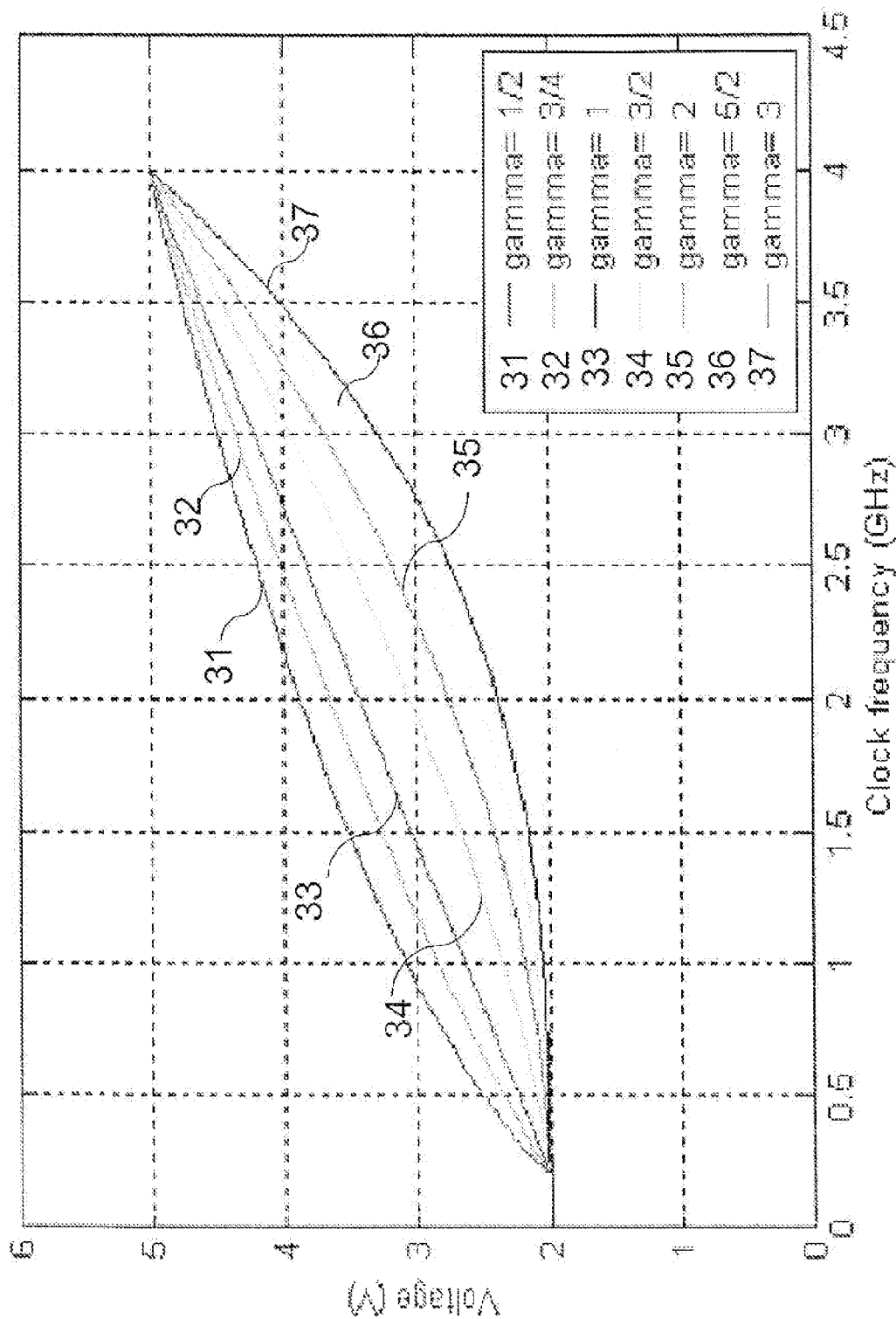
FIG. 2 is a plot of different models, showing the driving voltage of a microprocessor in function of the clock frequency of said microprocessor.

The $h_v(v)$ function of the above equation is represented in FIG. 2 for different values of the $\gamma$ parameter. Said h function may be used to determine the optimal clock rate and driving voltage of the microprocessors 9 when the number of active processors is determined. By replacing a single microprocessor working at a nominal clock rate $v_{max}$ by N identical microprocessor working at a nominal clock rate $v_n$ defined by $$v_n = v_{max}/N$$

which corresponds to the same processing capacity, the power consumption gain G (normalized bit speed divided by power consumption) is defined by:

$$G_N = h_v^2(v_{max}/N)/V_{max}^2$$

Figure 3:
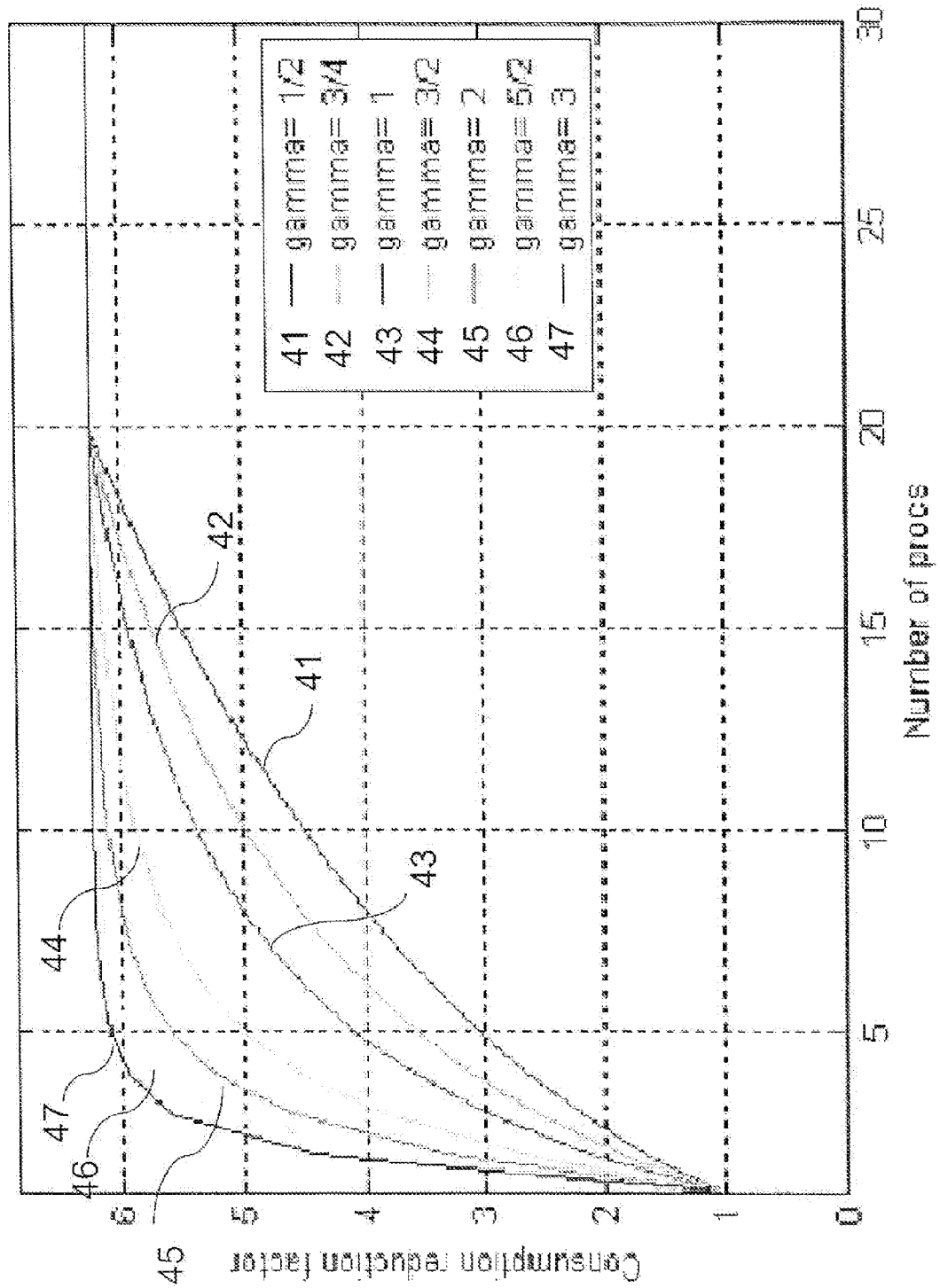
FIG. 3 is a plot of the consumption reduction factor (normalized bit processing speed divided by power consumption) in function of the number of microprocessors, for different models.

Such gain is represented in FIG. 3 for different values of the $\gamma$ parameter.

Thus, based on FIG. 3, one can see that the use of multiple identical microprocessors instead of a single microprocessor whose processing capacity is the sum of the capacities of the plurality of microprocessors allows to reduce the overall energy consumption. It also shows that the gain cannot exceed a threshold of 6 approximately with the selected set of model parameters used in this example.

Besides, considering an aggregation of a plurality of independent packet flows and considering that the rate stochastic process of each partial aggregate of packet flows follows a Gaussian distribution, the processing pipeline rate (Pr) that can be reached is given by the Guerin's law:

$$Pr_p = P \cdot \mu + \alpha \cdot \sqrt{P} \cdot \alpha$$

with P the number of independent packet flow aggregates, $\mu$ and $\sigma$ being respectively the average and the standard deviation of the Gaussian distribution of the packet flow aggregate rate and a $\alpha$ confidence factor, the value of which depends on the desired probability of not overloading the data exchange unit 7 (pipeline).

It has to be noticed that the Guerin's law allows to take into account the statistical multiplexing effect, that is to say, the fact that the aggregation of a large number of flows allows to attenuate the variations of the overall traffic (a flow peak compensating a flow off).

Thus, the use of a plurality of microprocessors corresponding to a parallelisation of the packet flow process leads to a reduction of the efficiency of the statistical multiplexing. Indeed, as in the case of a parallelisation of a plurality of microprocessors, the number of aggregated flows for a given microprocessor is reduced, the efficiency of the statistical multiplexing is also reduced. Such reduction of efficiency with respect to a single microprocessor is given by the rate loss factor RLF:

$$RLF_N = \frac{(N \cdot (P/N) \cdot \mu)}{(N \cdot (Pr_{P/N}))} \approx \left(1 + \alpha \cdot (\sigma/\mu) \cdot \sqrt{N/P}\right)^{-1}$$

with N the number of microprocessors.

Figure 4:
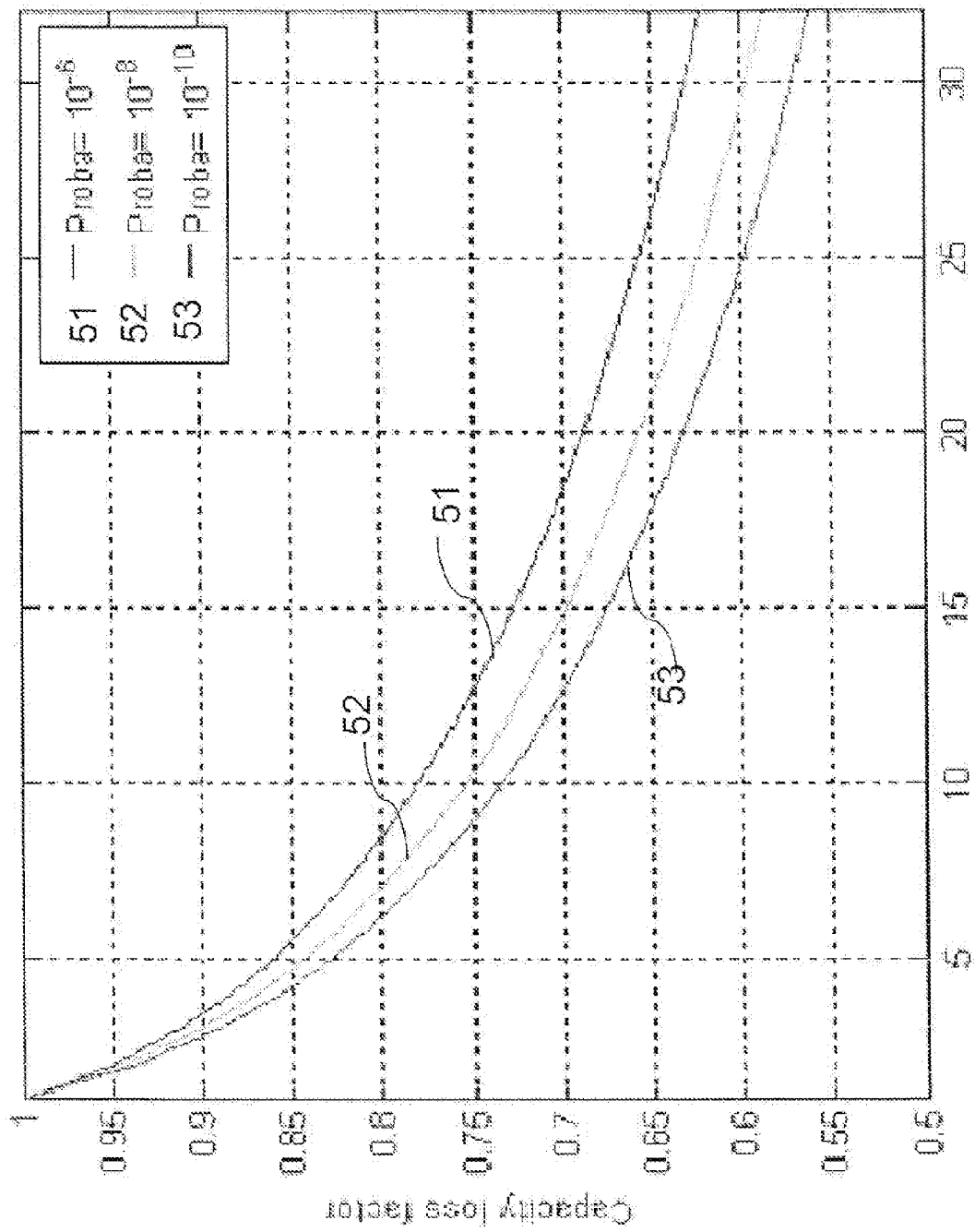
FIG. 4 is a plot of the capacity loss factor (normalized total packet processing speed for bursty traffic) in function of the number of microprocessors, for different packet-loss probabilities.

The plot of this rate loss factor, or normalized total packet processing speed, in function of the number of microprocessors for different values of the α parameter, corresponding to different desired probabilities of not overloading the data exchange unit 7 or pipeline, is shown in FIG. 4. The plot compares a single processor, at clock frequency f, to N processors at frequency f/N.

The above part of the description shows that the replacement of a single microprocessor by an array of a plurality of microprocessors having a comparable processing capacity leads on one hand to the reduction of the power consumption (corresponding to the power consumption gain G) and on the other hand to a loss of the efficiency of the statistical multiplexing (corresponding to the rate loss factor RLF). As a consequence, in order to optimize the overall energy consumption, the goal is to determine the number of microprocessors corresponding to the optimal trade-off between both parameters and leading to a minimization of the energy consumption per packet, taking into account the loss due to statistical multiplexing when filling the data exchange units or pipes. Such trade-off can be defined by the maximization of an energy efficiency gain EEG defined by:

$$Max_N=(EEG_N)=Max_N(G_n \times RLF_N)$$

Figure 5:
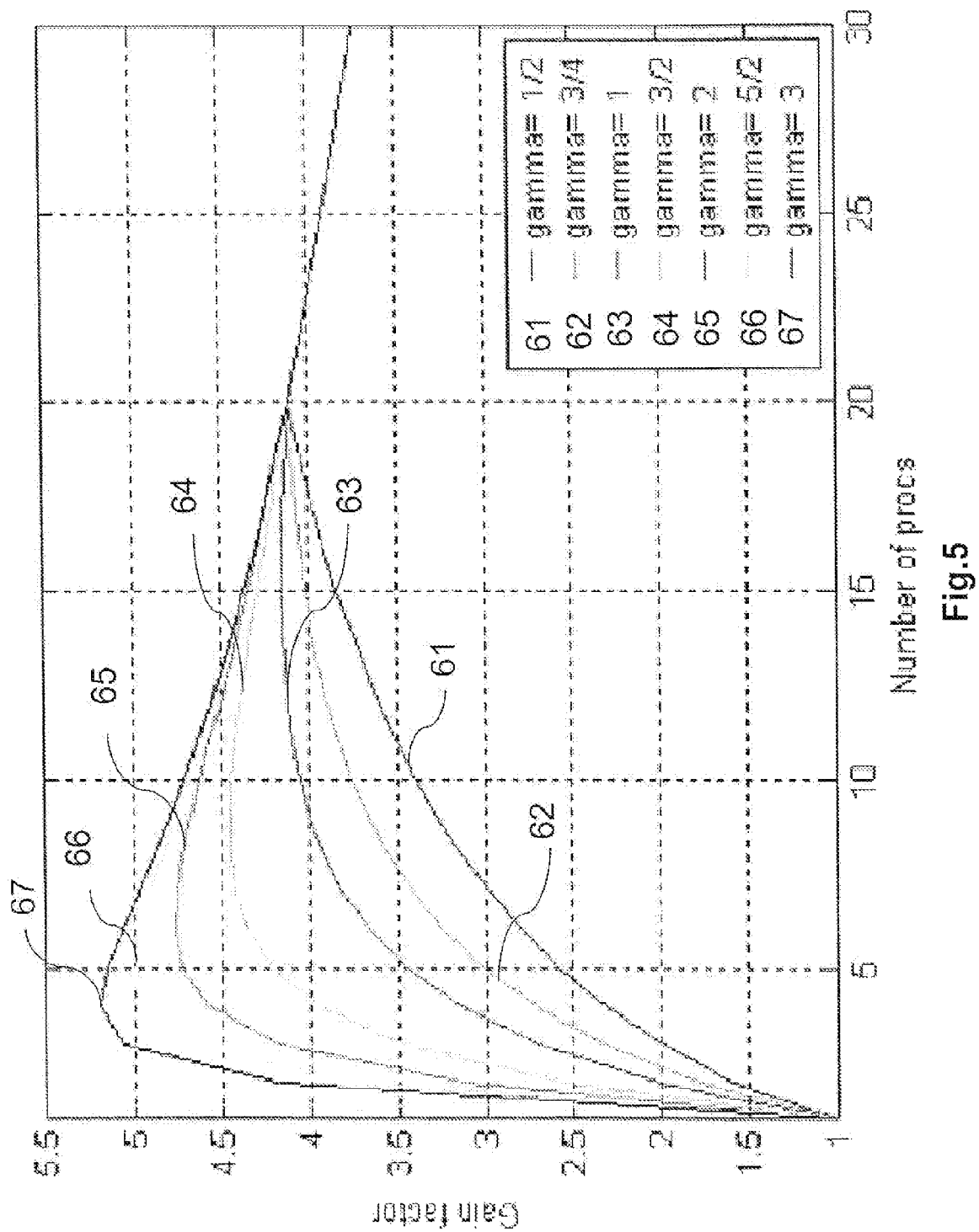
FIG. 5 is a plot of the gain factor (normalized packet processing speed divided by power consumption) in function of the number of microprocessors, for different models.

A representation of this energy efficiency gain (normalized packet speed divided by power consumption) in function of the number of microprocessors for an α parameter corresponding to a probability of $10^{-8}$ and for different values of the γ parameter is shown in FIG. 5.

From the different above representations, one can see that there is an optimal degree of parallelisation (or number of processors) in function of the processing traffic that leads to a maximisation of the energy efficiency, this degree depending on the technological properties of the microprocessors and on the variance of the packet traffic.

Thus, by considering the maximum amount of traffic that a linecard 1 is supposed to process (in practice considering a maximal average and a maximal standard deviation), an optimal dimensioning in terms of number of microprocessors 9 can be defined to minimize the energy consumption of the linecard 1.

The application of such optimization requires, in addition to the microprocessors features, the knowledge of statistical parameters of the flows to be processed which are the average and the standard deviation in the embodiment described previously.

The use of such a method using not only the average but also the standard deviation of the packet flows to be processed allows to take into account the loss of the statistical multiplexing due to the parallelisation in smaller data paths, leading to an improved determination of the optimized number of microprocessors 9.

Besides, the determination of the optimal number of microprocessors 9 in function of the amount of traffic can be used non only for dimensioning the linecard 1 during its conception process but also to dynamically determine the optimal number of microprocessors 9 that needs to be activated while in use, the non-activated microprocessors being set in a low consumption mode or sleep mode. Indeed, in order to further reduce the energy consumption, an idea of the embodiments of the present invention is to deactivate the idle microprocessors of the array when the traffic is reduced with respect to the peak periods in order to save energy. Thus, based on the previous equations, the traffic estimator 13 presented in FIG. 1 can determine the optimal number of microprocessors 9 that needs to be activated in function of the predicted traffic. In practice, the statistical parameters (average and standard deviation) of the packet bit rate are estimated at various time instants which allows to decide the activation or deactivation of the microprocessors 9.

The recurrence can be periodical (for example, these statistics may be derived from the 200 latest 10 ms measurements of the instantaneous amount of packet input bytes and could be updated every 100 measurements, thus feeding the microprocessor scheduler 15 with new metrics every second), but the sample intervals can also vary with the time, for example the delay between two estimations can be reduced in case of large variations of the traffic. Furthermore, the choice of time intervals may depend on the nature of the traffic involved, for example, whether it is an aggregation of few or many flows. The size of the packet buffers available in the node may also influence the size of the interval.

In a typical implementation, the packet traffic $b_1, b_2 \ldots b_n$, in the m successive intervals $t_1-t_0, t_2-t_1 \ldots t_m-t_{m-1}$ is monitored. The instantaneous rates $r_i=b_i/(t_i-t_{i-1})$ for i=1 ... m are then computed to produce the statistical parameters:

$$\mu = \frac{1}{m}\sum_{i=1}^{m} r_i \text{ and } \sigma^2 = \frac{1}{m}\sum_{i=1}^{m}(r_i - \mu)^2$$

It has also to be noted that other parameters or metrics representative of the statistical distribution of the packet traffic can be used by the traffic estimator 13. These metrics may refer to statistical moments of second or higher order defined by:

$$moment_p = \frac{1}{m}\sum_{i=1}^{m} r_i^p$$

with p the order of the moment,
as well as auto-correlations at different time scales of the above mentioned rate sample sets. Metrics such as quantiles may also be used and a number of metrics higher than two (average and standard deviation) is used if necessary. Moreover, a temporal correlation of the packet traffic measurements may be additionally used, for example by using models that comprise the Hurst parameter, to produce an even improved prediction of the processing load.

Figure 6:
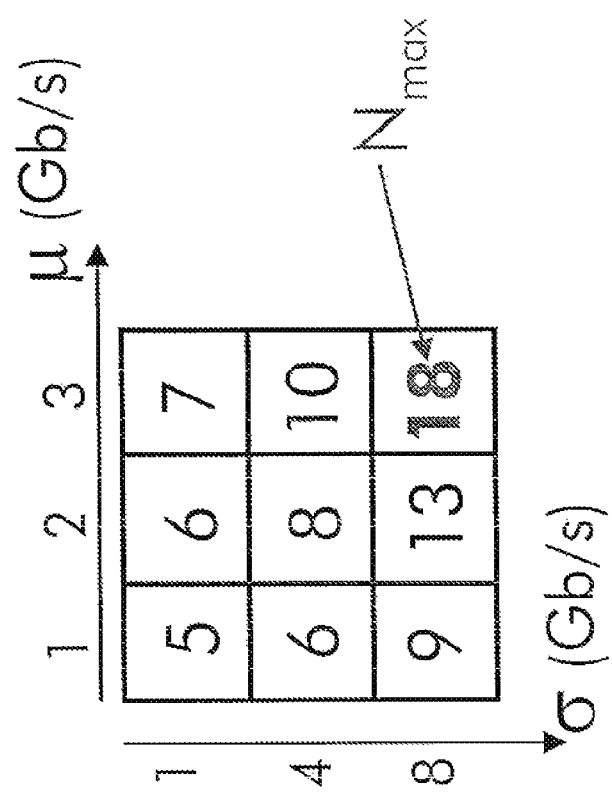
FIG. 6 is a diagram of an example of look-up table used for determining the optimal number of active processors in function of statistical parameters.

Besides, independently of the metrics used for the computation, the values of the optimal number of microprocessors to be activated in function of the amount of traffic can be pre-calculated and stored in additional resource-planning look-up tables 14 attached to the traffic estimation unit 13, and different from the packet-forwarding lookup tables 11, as presented in FIG. 1, in order to reduce the computation load and to make the process faster. An example of additional look-up table is described in FIG. 6 wherein the optimal number of microprocessors is given in function of the average and the standard deviation. It has to be noted that the additional look-up table may not comprise all the possible values of the metrics, mainly for reducing the size of the memory, as it is the case for the standard deviation in the example of FIG. 6. In this case, if the computed value corresponds to an intermediate value ($\sigma=6$ in the present example), an interpolation is achieved to derive the wanted value. The size of the look-up tables 14 is therefore a trade-off between the memory available and the processing capacity to compute interpolations.

In the same way as for the number of microprocessors 9, the optimal (in an energy efficiency way) clock rate and driving voltage of the active microprocessors can be determined based on the statistical parameters of the packet traffic and can be saved in additional look-up tables such that the traffic estimator 13 or the scheduler 15 controls said clock rate and driving voltage as described in FIG. 1.

Thus, the dynamic estimation of the traffic allows to activate the right number of microprocessors to respect a predefined quality of service (QoS) such that the work load for each processor is not too high and not too low.

Figure 7:
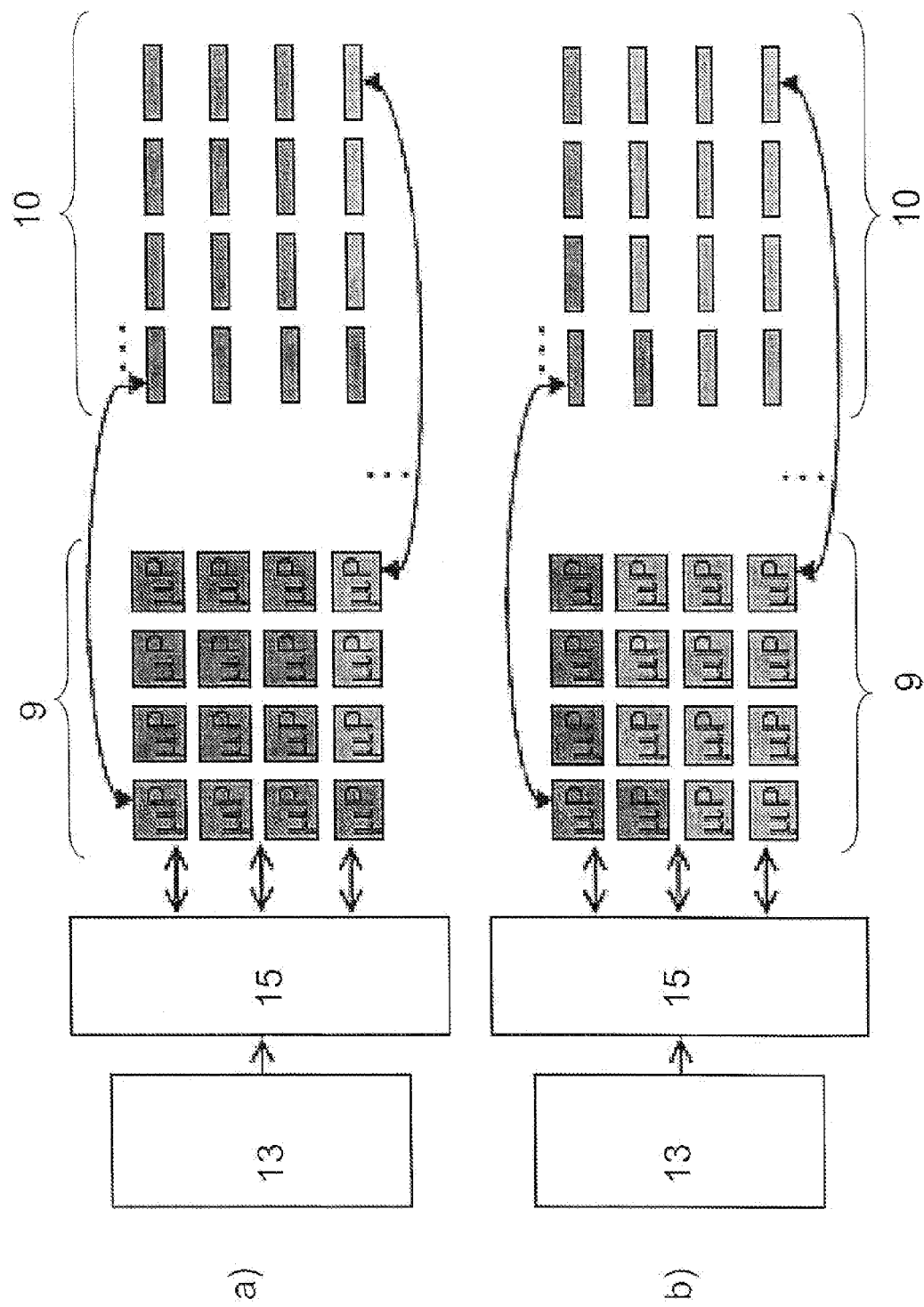
FIG. 7 is a diagram of two linecard configurations corresponding to two different traffic situations.

As described in FIG. 7 with an array of 16 microprocessors, if the traffic corresponds to 80% of the overall capacity of the linecards then 20% of the microprocessors 9 and the corresponding memories (read-only memories for example) 10 are set in a sleep mode (part a) of the figure). Such deactivation may be achieved by setting the clock rate of the microprocessor to zero. If the traffic goes down to 30% of the overall capacity then 70% of the microprocessors are set in a sleep mode (part b) of the figure).

Figure 8:
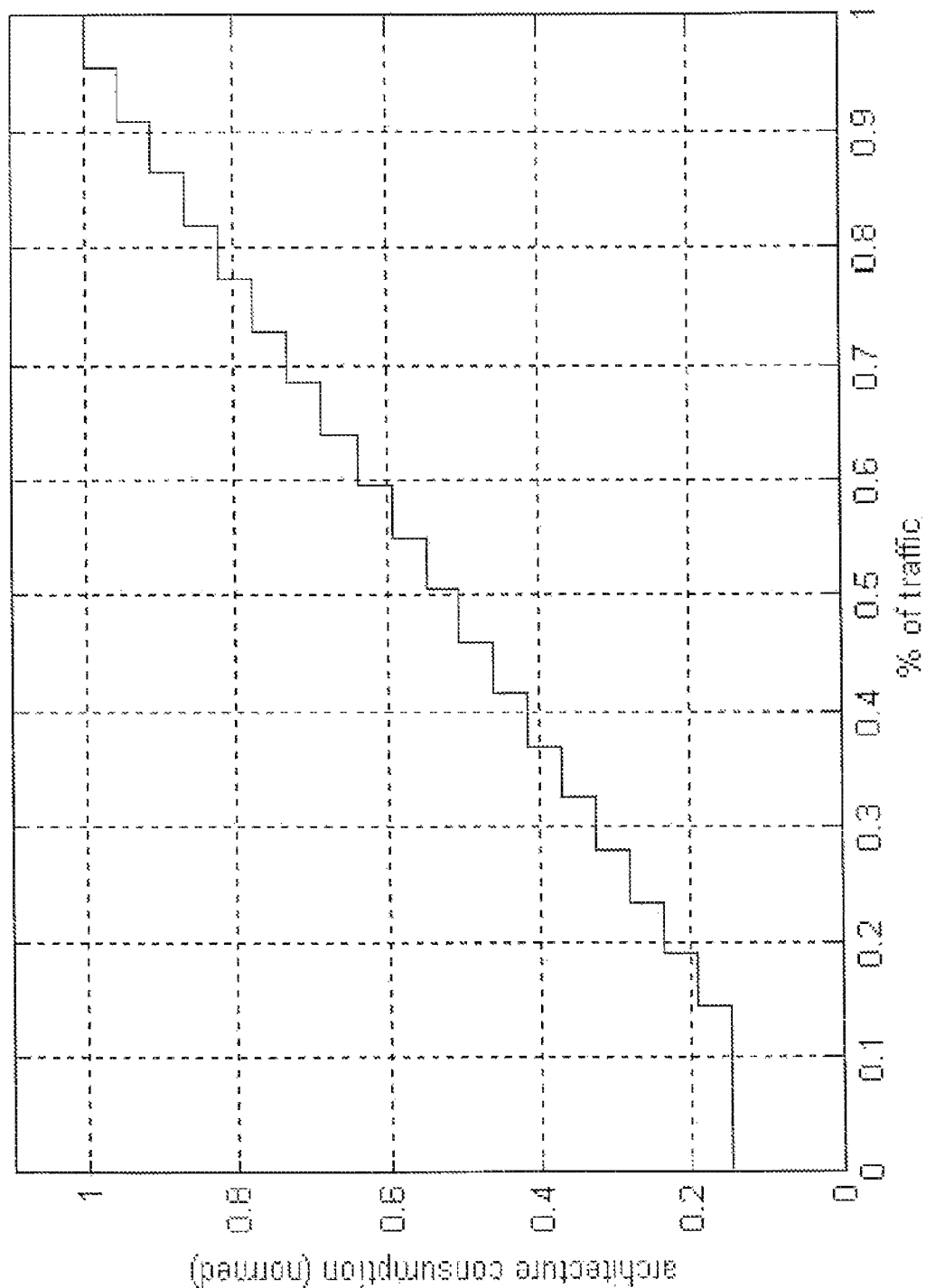
FIG. 8 is a plot of a linecard power consumption in function of the traffic to be processed.

As a consequence, the overall consumption of the linecard varies as the steps of a stair in function of the traffic as described in FIG. 8, a step corresponding to the activation of a microprocessor.

Besides, the array of microprocessors has to be configured such that the following constraints are respected:

- packets belonging to a common end-to-end flow must be handled in order. Such constraint can be respected by processing packets of a common flow, detected by the use of a hash value, in the same microprocessor, and, in case of activation or deactivation of a microprocessor, by re-routing packets to or from a neighboring microprocessor.
- reading and updating shared common resources (like routing tables) simultaneously must be avoided. Resources access must be locked to other microprocessors during reading or updating by a given microprocessor. Such constraints may be handled as well-known in the state of the art in multi-core, multi-task systems, but may introduce delays in the processing due to the waiting time before access to the resources. The related loss in overall packet processing power is considered smaller than the loss due to traffic variance and may be accounted for as a part of the statistical traffic model.
- on bursts of demand, wake-up delays must be short so that the induced network delays respect a predetermined Quality of Service (QoS). As a consequence, a delay is introduced before deactivation of a microprocessor to prevent from very short deactivation periods (inducing delays while not contributing to save energy).
- the separation of traffic in parallel streams requires a higher bandwidth reserve due to the reduced statistical multiplexing efficiency: this bandwidth allocation is the purpose of the traffic estimation unit 13 of the invention.

Furthermore, according to an embodiment of the present invention, packet traffic is divided into packet classes and microprocessors are specialized to process a specific class of packet (using specific forwarding/queuing/dropping algorithms).

With such a configuration, the class specification of the microprocessors is taken into account to decide of the activation and the deactivation of the microprocessors.

According to a further embodiment, in case of congestion in the packet linecard, packet flows are sorted according to their quality-of-service (QoS) value, such that the most valuable flows are processed in priority.

Thus, the present invention, by replacing a single microprocessor of a packet linecard 1 by an array of microprocessors 9 wherein the dimensioning as well as the dynamic configuration (activation and deactivation of the microprocessors of the array) of said array are optimized by the use of an accurate traffic estimator 13. Said estimator 13 determining the processing load in function of different statistical parameters representative of the packet traffic while taking into account the reduction of statistical multiplexing due to the use of a plurality of microprocessors. Such traffic analysis allows to dynamically adjust the processing capacities to the amount of traffic and therefore leads to a significant reduction of the overall energy consumption of a packet processing linecard 1.

What is claimed is:

1. A method for reducing energy consumption in a packet processing linecard of a packet transmission network, said packet processing linecard comprising a plurality of microprocessors aimed at processing packet traffic, the method comprising the steps of:
   recurrently estimating, by a traffic estimator, at least two statistical parameters including an average and a parameter representative of a statistical distribution of the packet traffic; and
   dynamically adjusting a number of active microprocessors as a function of a computation of the traffic estimator, wherein the parameter representative of the statistical distribution of the packet traffic comprises a statistical moment of the packet traffic and
   wherein the statistical moment of the packet traffic comprises a standard deviation of the packet traffic.

2. A method for reducing energy consumption in a packet processing linecard of a packet transmission network, said packet processing linecard comprising a plurality of microprocessors aimed at processing packet traffic, the method comprising the steps of:
   recurrently estimating, by a traffic estimator, at least two statistical parameters including an average and a parameter representative of a statistical distribution of the packet traffic; and
   dynamically adjusting a number of active microprocessors as a function of a computation of the traffic estimator, wherein the parameter representative of the statistical distribution of the packet traffic comprises a quantile of the packet traffic.

3. A method for reducing energy consumption in a packet processing linecard of a packet transmission network, said packet processing linecard comprising a plurality of microprocessors aimed at processing packet traffic, the method comprising the steps of:

recurrently estimating, by a traffic estimator, at least two statistical parameters including an average and a parameter representative of a statistical distribution of the packet traffic; and dynamically adjusting a number of active microprocessors as a function of a computation of the traffic estimator, wherein a delay is introduced before deactivating a microprocessor in order to reduce very short periods of inactivity of the microprocessor.

4. A method for reducing energy consumption in a packet processing linecard of a packet transmission network, said packet processing linecard comprising a plurality of microprocessors aimed at processing packet traffic, the method comprising the steps of:

recurrently estimating, by a traffic estimator, at least two statistical parameters including an average and a parameter representative of a statistical distribution of the packet traffic; and dynamically adjusting a number of active microprocessors as a function of a computation of the traffic estimator, wherein microprocessors are configured to process specific classes of packets such that a decision of activating or deactivating a microprocessor takes into account the packet class-specific configuration of said microprocessor.

* * * * *